US012308223B2

(12) United States Patent
Hosoo

(10) Patent No.: US 12,308,223 B2
(45) Date of Patent: May 20, 2025

(54) MASS SPECTROMETER

(71) Applicant: SHIMADZU CORPORATION, Kyoto (JP)

(72) Inventor: Kohei Hosoo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/768,929

(22) PCT Filed: Aug. 11, 2020

(86) PCT No.: PCT/JP2020/030557
§ 371 (c)(1),
(2) Date: Apr. 14, 2022

(87) PCT Pub. No.: WO2021/106277
PCT Pub. Date: Jun. 3, 2021

(65) Prior Publication Data

US 2024/0105437 A1 Mar. 28, 2024

(30) Foreign Application Priority Data

Nov. 28, 2019 (JP) ................................ 2019-215654

(51) Int. Cl.
*H01J 49/06* (2006.01)
*H01J 49/24* (2006.01)

(52) U.S. Cl.
CPC .......... *H01J 49/062* (2013.01); *H01J 49/068* (2013.01); *H01J 49/24* (2013.01)

(58) Field of Classification Search
None
See application file for complete search history.

(56) References Cited

U.S. PATENT DOCUMENTS 6,797,948 B1 * 9/2004 Wang .................... H01J 49/063 250/288
2015/0108348 A1 * 4/2015 Mukaibatake ......... G01N 27/62 250/290

(Continued)

FOREIGN PATENT DOCUMENTS

EP 2 843 685 A2 3/2015
JP 2015-050085 A 3/2015
WO 2019/155543 A1 8/2019

OTHER PUBLICATIONS

Nihon Watrs K.K., "Acquity QDa Detector-Mass Spectrometry (MS) Detector", searched Oct. 29, 2019, 2 pages.

(Continued)

*Primary Examiner* — Eliza W Osenbaugh-Stewart
(74) *Attorney, Agent, or Firm* — Sughrue Mion, PLLC

(57) ABSTRACT

A mass spectrometer includes: a first ion guide disposed in a first intermediate vacuum chamber; a first partition wall portion which constitutes at least a part of a partition wall separating the first intermediate vacuum chamber and a second intermediate vacuum chamber and has an ion passage hole; a second ion guide disposed in a second intermediate vacuum chamber; a second partition wall portion which constitutes at least a part of a partition wall which is a subsequent stage of the second intermediate vacuum chamber and has an ion passage hole; a first holding portion configured to integrally hold the first ion guide and the first partition wall portion; a second holding portion configured to hold the second ion guide; a coupling portion detachably connecting the first holding portion and the second holding portion; and a vacuum chamber main body portion to which an ion transport unit is detachably mounted.

6 Claims, 7 Drawing Sheets

(56) References Cited

U.S. PATENT DOCUMENTS

| | | | | |
|---|---|---|---|---|
| 2017/0263429 | A1* | 9/2017 | Dominguez ........ | H01J 49/4255 |
| 2020/0395203 | A1* | 12/2020 | Murray ................. | H01J 49/068 |
| 2021/0175066 | A1 | 6/2021 | Ueda et al. | |

OTHER PUBLICATIONS

Written Opinion of the International Searching Authority for PCT/JP2020/030557 dated, Nov. 10, 2020 (PCT/ISA/237).
International Search Report for PCT/JP2020/030557 dated, Nov. 10, 2020 (PCT/ISA/210).
Notice of Allowance issued Sep. 6, 2022 in Japanese Application No. 2021-561158.
Communication issued Mar. 29, 2025 in Chinese Application No. 202080076688.5.

* cited by examiner

MASS SPECTROMETER

CROSS REFERENCE TO RELATED APPLICATIONS

This application is a National Stage of International Application No. PCT/JP2020/030557 filed Aug. 11, 2020, claiming priority based on Japanese Patent Application No. 2019-215654 filed Nov. 28, 2019.

TECHNICAL FIELD

The present invention relates to a mass spectrometer, and more particularly to a mass spectrometer having a configuration of a multi-stage differential exhaust system.

BACKGROUND ART

In a mass spectrometer equipped with an ion source by an atmospheric pressure ionization method such as an electrospray ionization (ESI) method or an atmospheric pressure chemical ionization (APCI) method, a configuration of a multi-stage differential exhaust system is adopted in order to maintain a high degree of vacuum in a high vacuum chamber in which a mass separator such as a quadrupole mass filter is disposed. In a mass spectrometer of a multi-stage differential exhaust system, ions derived from a sample component generated in an ion source are transported to a high vacuum chamber through one or a plurality of intermediate vacuum chambers. In the transport path of the ions, an ion optical element for converging the ions by the action of an electric field, for transporting the ions while trapping the ions, or, in some cases, for accelerating the ions is arranged. The ion optical element herein includes an ion guide, an ion lens, a skimmer (skimmer cone), a deflector, and the like.

In such a mass spectrometer, neutral particles, ions, and the like derived from the sample adhere to the ion optical element at the time of analysis. The longer the device is used, the quality, such as the detection sensitivity or mass accuracy, of the device may deteriorate due to contamination of the ion optical elements. Therefore, a user (operator) or a customer service person periodically or non-periodically performs maintenance work such as taking out the ion optical element from the device main body and cleaning the ion optical element. A conventional general mass spectrometer adopts a structure, for example, in which a lid is provided on an upper portion of a vacuum chamber, and the ion optical element can be removed upward or mounted downward in a state where the lid is opened so that the maintenance work can be easily performed (see Patent Literature 1 and the like).

A liquid chromatograph mass spectrometry (LC-MS) system using the mass spectrometer as described above as a detector of a liquid chromatograph (LC) generally includes a plurality of units such as a liquid feeding unit including a pump which feeds a mobile phase, an injection unit which supplies a sample into the mobile phase, and a column oven unit which houses a column, in addition to the detector unit. A general quadrupole mass spectrometer is considerably larger in size than the above described other units than the detector unit. Therefore, the detector unit that is the quadrupole mass spectrometer is installed separately from the other units, and as a result, the LC-MS system requires a relatively large installation space.

As the field of use of the LC-MS system expands, it has been strongly required to reduce the installation space of the system, and in recent years, a device that is considerably smaller than a conventional general quadrupole mass spectrometer has been developed. For example, in the LC-MS system disclosed in Non Patent Literature 1, the size of a detector unit that is a mass spectrometer is suppressed to the size comparable to other units, and a system configuration in which units including the detector unit are stacked is possible.

CITATION LIST

Patent Literature

Patent Literature 1: WO 2019/155543 A
Patent Literature 2: JP 2015-50085 A

Non Patent Literature

Non Patent Literature 1: "ACQUITY QDa Detector-Mass Spectrometry (MS) Detector", [online], Nihon Waters K. K., [searched on Oct. 29, 2019], Internet

SUMMARY OF INVENTION

Technical Problem

The conventional mass spectrometer has the following problems.

In a mass spectrometer having a configuration of a multi-stage differential exhaust system, a plurality of intermediate vacuum chambers are arranged between the ionization chamber and a high vacuum chamber. In each of the intermediate vacuum chamber, ion optical elements such as an ion guide and an ion lens are arranged, and on a partition wall separating these chambers other ion optical elements such as a skimmer cone and a lens electrode are also arranged. When the ion optical element is maintained, it is necessary to detach the ion optical element from the device and attach the ion optical element to the device one by one, and the work is considerably laborious and requires great care.

In addition, since the detector unit that is a mass spectrometer includes a vacuum chamber made of stainless steel or the like, a vacuum pump, and the like, the detector unit has a larger weight than other units constituting the LC-MS system. Therefore, when a plurality of units are stacked, the detector unit is generally placed at the bottom. When maintenance of the ion optical element is to be performed in the LC-MS system having such a configuration, it is necessary to first move another unit placed above the detector unit, which also complicates the maintenance work and elongates the work time.

The present invention has been made to solve at least a part of the above problems, and an object of the present invention is to provide a mass spectrometer capable of reducing time and effort required for maintenance of an ion optical element in the mass spectrometer having a configuration of a multi-stage differential exhaust system.

Solution to Problem

One aspect of a mass spectrometer according to the present invention made to solve the above problems is a mass spectrometer including a plurality of intermediate vacuum chambers in which a degree of vacuum increases stepwise between an ionization chamber that ionizes a sample component under atmospheric pressure and a high vacuum chamber that performs mass spectrometry of ions generated in the ionization chamber, the mass spectrometer including:

- a first ion guide disposed in a first intermediate vacuum chamber which is a subsequent stage of the ionization chamber and configured to transport ions using an electric field;
- a first partition wall portion which constitutes at least a part of a partition wall separating the first intermediate vacuum chamber and a second intermediate vacuum chamber which is a subsequent stage of the first intermediate vacuum chamber, and has an ion passage hole;
- a second ion guide disposed in the second intermediate vacuum chamber and configured to transport ions using an electric field;
- a second partition wall portion which constitutes at least a part of a partition wall separating the second intermediate vacuum chamber and a vacuum chamber which is a subsequent stage of the second intermediate vacuum chamber, and has an ion passage hole;
- a first holding portion configured to hold the first ion guide and the first partition wall portion integrally;
- a second holding portion configured to hold the second ion guide;
- a coupling portion configured to detachably couple the first holding portion and the second holding portion; and
- a vacuum chamber main body portion to which an ion transport unit is detachably mounted, the ion transport unit being formed by the first holding portion and the second holding portion coupled by the coupling portion, the first holding portion being in a state of holding the first ion guide and the first partition wall portion, and the second holding portion being in a state of holding the second ion guide.

Any forms are included in the first ion guide and the second ion guide as long as the first ion guide and the second ion guide transport ions to the subsequent stage by the action of an electric field including a radio-frequency electric field, a direct-current electric field, or both of them. For example, a plurality of rod electrodes or flat plate electrodes arranged around the ion optical axis can be included, or a plurality of flat plate electrodes arranged in the extending direction of the ion optical axis can be included. In addition, the first partition wall portion and the second partition wall portion can be typically a skimmer cone having a small-diameter ion passage hole at the top, a disk-shaped lens electrode having a small-diameter ion passage hole at the center, or the like.

Advantageous Effects of Invention

In the mass spectrometer according to the above aspect of the present invention, a plurality of ion optical elements from a first ion guide for transporting ions introduced into the first intermediate vacuum chamber to a second ion guide for transporting ions introduced into the second intermediate vacuum chamber are substantially integrated as an ion transport unit. By attaching the ion transport unit to the vacuum chamber main body portion, each intermediate vacuum chamber is formed, and the first and second ion guides are arranged at appropriate positions in each intermediate vacuum chamber.

Therefore, according to the mass spectrometer according to the above aspect of the present invention, when maintenance such as cleaning of various ion optical elements disposed in the intermediate vacuum chamber is performed, the ion optical elements are integrally removed from the device as a unit instead of removing each ion optical element one by one from the device. In addition, even when each ion optical element is attached to the device after completion of maintenance, a plurality of ion optical elements can be integrally mounted to the device as a unit. As a result, the operation at the time of performing the maintenance of the ion optical element becomes very simple, and the efficiency of the operation is improved. In addition, since the first holding portion which holds the first ion guide and the first partition wall portion and the second holding portion which holds the second ion guide can be easily separated, the operation of cleaning each ion optical element after the unit including them is detached from the device is also simple, and the operation efficiency is improved.

DESCRIPTION OF EMBODIMENTS

A mass spectrometer according to an embodiment of the present invention will be described with reference to the accompanying drawings.

This mass spectrometer is a single-type quadrupole mass spectrometer equipped with an ESI ion source.

[Entire Configuration of Mass Spectrometer of Present Embodiment]

Figure 1:
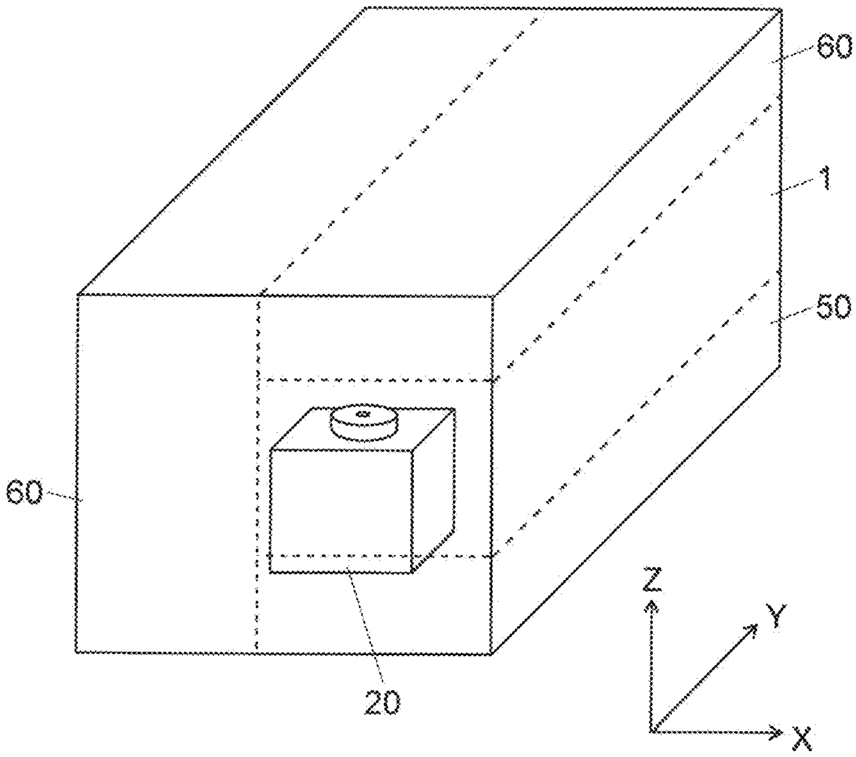
FIG. 1 is an external perspective view of an embodiment of a mass spectrometer according to the present invention.

FIG. 1 is an external perspective view of a mass spectrometer of the present embodiment.

Figure 2:
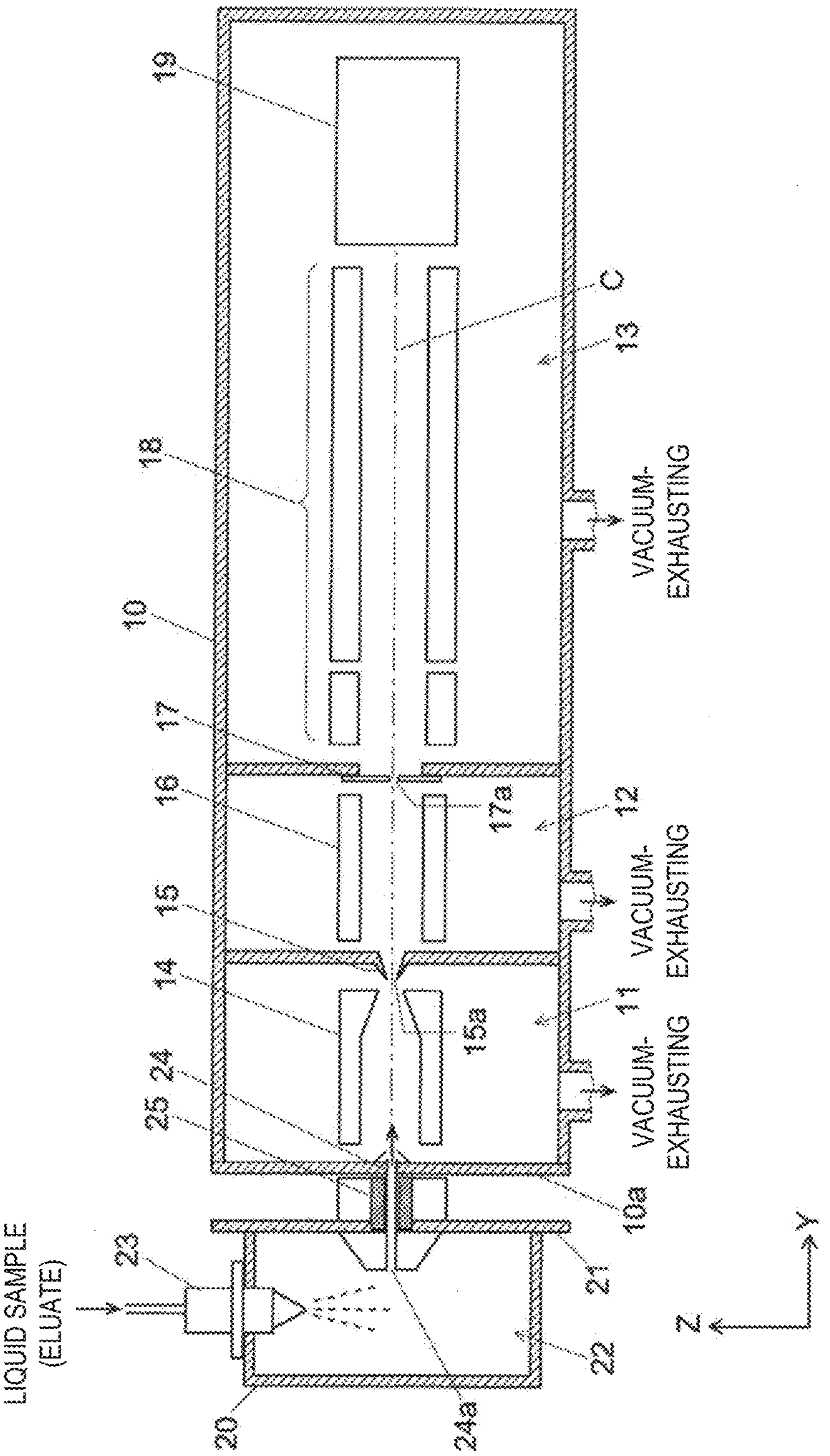
FIG. 2 is a schematic cross-sectional configuration view of the mass spectrometer of the present embodiment.

FIG. 2 is a schematic cross-sectional configuration view of a main part of the mass spectrometer of the present embodiment.

Note that, for convenience of description, three axes of an X axis, a Y axis, and a Z axis orthogonal to each other are defined in a space as illustrated in FIG. 1. The Z-axis direction is the height direction of the device, the Y-axis direction is the depth direction of the device, and the X-axis direction is the width direction of the device.

As illustrated in FIG. 1, the mass spectrometer of the present embodiment has a substantially rectangular outer shape, and an ionization chamber 20 in which an ionization chamber is formed protrudes forward, that is, toward an operator. A vacuum chamber 1 having an elongated shape in the depth direction is disposed behind the ionization chamber 20. In addition, a vacuum pump unit 50 for vacuum-exhausting the inside of the vacuum chamber 1 is disposed below the vacuum chamber 1, and a circuit unit 60 accommodating various electric circuits is disposed above and to the left of the vacuum chamber 1.

As illustrated in FIG. 2, the vacuum chamber 1 includes a vacuum chamber main body portion 10 having a front opening, and a vacuum flange 10*a* which closes the opening. The inside of the vacuum chamber 1 is partitioned into three chambers in the depth direction (Y-axis direction), such as a first intermediate vacuum chamber 11, a second intermediate vacuum chamber 12, and a high vacuum chamber 13. In addition, an ionization chamber 20 defining an ionization chamber 22 therein and a DL flange 21 to which a desolvation line 24 is attached are provided in front of the vacuum chamber 1. The three chambers of the first intermediate vacuum chamber 11, the second intermediate vacuum chamber 12, and the high vacuum chamber 13 are vacuum-exhausted by a vacuum pump installed in the vacuum pump unit 50 or outside the present device, and the degree of vacuum of the first intermediate vacuum chamber 11, the second intermediate vacuum chamber 12, and the high vacuum chamber 13 increases stepwise. On the other hand, the ionization chamber 22 communicates with the outside, and the inside thereof is substantially at atmospheric pressure. As an example, the degree of vacuum in the first intermediate vacuum chamber 11 is about 300 Pa, the degree of vacuum in the second intermediate vacuum chamber 12 is about 3 Pa, and the degree of vacuum in the high vacuum chamber 13 is about $6.0\times10^{-3}$ Pa, and the degree of vacuum increases stepwise.

The ionization chamber 22 is provided with an ionization probe 23 which nebulizes a liquid sample while charging the liquid sample, and the ionization chamber 22 and the first intermediate vacuum chamber 11 communicate with each other through the desolvation line 24 having a small diameter. A heater 25 is provided around the desolvation line 24, and the desolvation line 24 is heated to a predetermined temperature by the heater 25.

A first ion guide 14 is disposed inside the first intermediate vacuum chamber 11, and the first intermediate vacuum chamber 11 and the second intermediate vacuum chamber 12 communicate with each other through a small hole formed at the top of a skimmer (skimmer cone) 15. A second ion guide 16 is disposed inside the second intermediate vacuum chamber 12, and the second intermediate vacuum chamber 12 and the high vacuum chamber 13 communicate with each other through a small hole formed at the center of a lens electrode 17. Inside the high vacuum chamber 13, a quadrupole mass filter 18 including a pre-rod electrode and a main rod electrode, and an ion detector 19 are disposed.

As illustrated in FIG. 2, the desolvation line 24, the first ion guide 14, the skimmer 15, the second ion guide 16, the lens electrode 17, the quadrupole mass filter 18, and the ion detector 19 are arranged along a substantially linear ion optical axis C.

[Analysis Operation of Mass Spectrometer of Present Embodiment]

An analysis operation in the mass spectrometer of the present embodiment will be briefly described.

An eluate containing components separated by a column of a liquid chromatograph (LC) (not illustrated) is supplied to the ionization probe 23. A DC high voltage is applied to the tip of the ionization probe 23, and the eluate is nebulized into the ionization chamber 22 at substantially atmospheric pressure while being given a biased charge by an electric field formed by the voltage. In the process of vaporizing the solvent in the nebulized charged droplets, the sample component is ionized. Note that, the sample components may be ionized by an ionization method such as an APCI method or an atmospheric pressure photoionization (APPI) method other than the ESI method.

Ions derived from the sample component generated in the ionization chamber 22 are entrained in a gas flow generated by a pressure difference between both ends of the desolvation line 24, and are sucked into the desolvation line 24 from an ion introduction port 24*a*. In addition, the charged droplet in which the solvent is not sufficiently vaporized is also sucked into the desolvation line 24, but even in this case, desolvation proceeds in the desolvation line 24 at a high temperature, and ionization is promoted.

The ions thus sent into the first intermediate vacuum chamber 11 through the desolvation line 24 are converged near an orifice 15*a* formed at the top of the skimmer 15 by the radio-frequency electric field applied to the first ion guide 14. Then, the ions enter the second intermediate vacuum chamber 12 through the orifice 15*a*. The ions derived from the sample component are transported while being captured by the radio-frequency electric field applied to the second ion guide 16 in the second intermediate vacuum chamber 12, converged by the lens electrode 17 to which a predetermined DC voltage is applied, and introduced into the high vacuum chamber 13 through a small hole 17*a* at the center thereof. Thereafter, only ions having a specific mass-to-charge ratio corresponding to the voltage applied to the rod electrode of the quadrupole mass filter 18 (voltage obtained by combining the DC voltage and the radio-frequency voltage) pass through the quadrupole mass filter 18, and the other ions diverge on the way. The ion detector 19 detects ions entering through the quadrupole mass filter 18, and outputs a detection signal corresponding to the amount of the ions.

In this manner, in the mass spectrometer of the present embodiment, ions derived from the sample component generated in the ionization chamber 22 located on the most front side as viewed from the operator are introduced into the vacuum chamber 1 located behind the ionization chamber 22, and are sent from the front side to the rear side as a whole. The ions sent to the high vacuum chamber 13 are separated by the quadrupole mass filter 18 according to the mass-to-charge ratio, and then detected by the ion detector 19 in the final stage.

[Detailed Configuration of Ion Optical Element Disposed in Intermediate Vacuum Chamber]

At the time of analysis as described above, droplets in which the solvent is not yet completely vaporized jump into the first intermediate vacuum chamber 11. In addition, neutral particles such as unionized sample component molecules and sample component molecules or solvent molecules generated by recombination of ions also enter the first intermediate vacuum chamber 11 and the second intermediate vacuum chamber 12. When such droplets, neutral particles, ions, or the like adhere to the ion guides 14 and 16 or the like and become dirty, the generated electric field is disturbed, and the behavior of the ions becomes unstable or not ideal. In order to avoid this, it is necessary to take out the ion guides 14 and 16 and the like from the device and clean the ion guides. As described below, the mass spectrometer of the present embodiment has a structure in which the ion optical elements such as the ion guides 14 and 16 can be easily taken out from the device.

As illustrated in FIG. 1, the ionization chamber 20 protruding forward can be opened to the front right by a hinge (not illustrated) rotating about an axis extending in the vertical direction (Z-axis direction). This can have a structure as described in Patent Literature 2, for example. In a state where the ionization chamber 20 is opened, the DL flange 21 disposed in the ionization chamber can be removed to the front side. The desolvation line 24 and the heater 25 are fixed to the DL flange 21, and can be removed forward at the same time as the DL flange 21.

When the DL flange 21 is removed, the front face of the vacuum flange 10*a* forming the front wall of the vacuum chamber 1 is exposed inside the DL flange 21. The vacuum flange 10*a* is fixed to the vacuum chamber main body portion 10 from the front side by a screw, and when the screw is loosened, the vacuum flange 10*a* can be removed to the front side. Further, an ion transport unit including the ion optical elements in the first intermediate vacuum chamber 11 and the second intermediate vacuum chamber 12 is pulled forward through the front opening of the vacuum chamber main body portion 10 formed by removing the vacuum flange 10*a*, so that the ion transport unit can be taken out.

Figure 3:
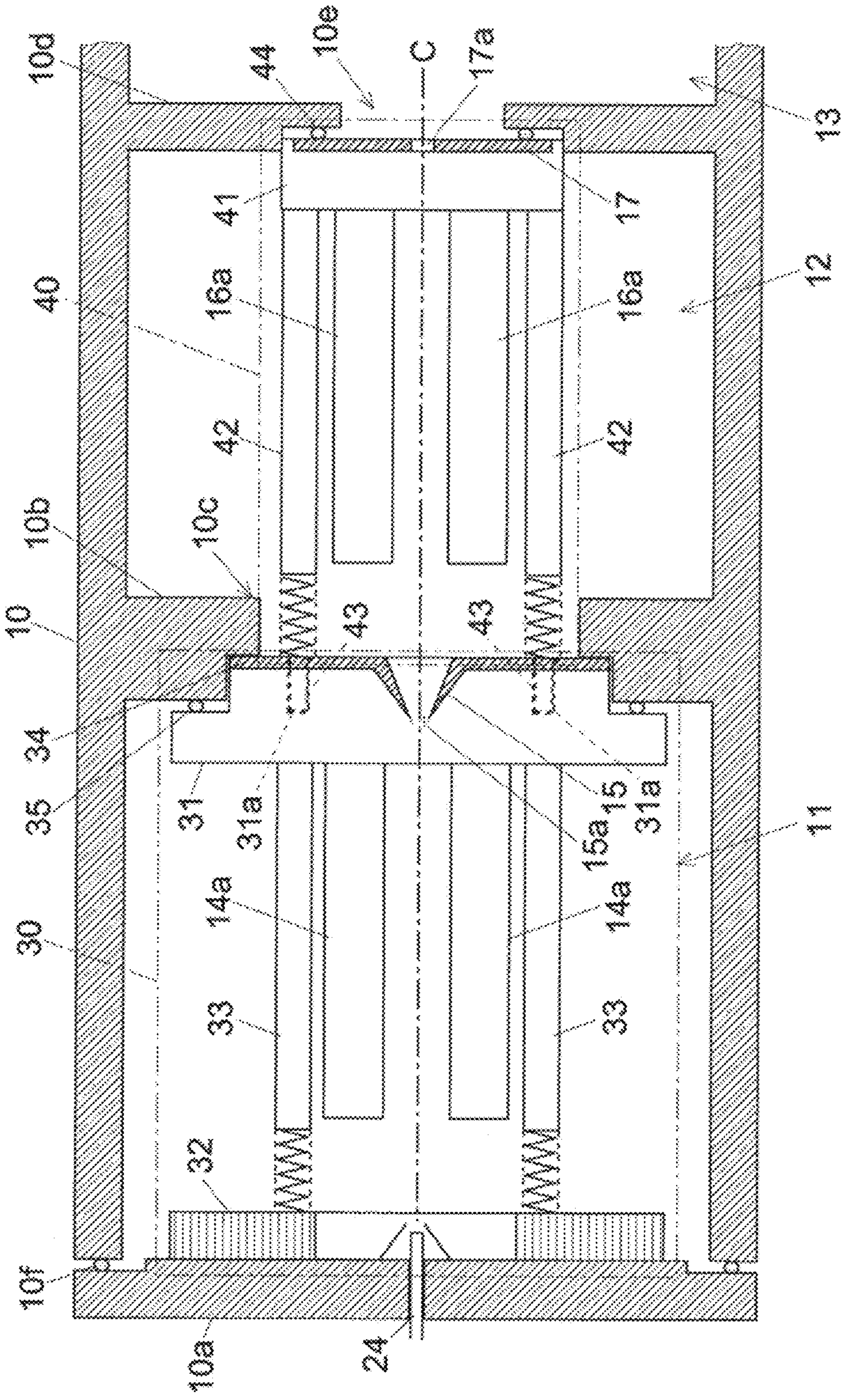
FIG. 3 is a schematic cross-sectional view illustrating a state where an ion transport unit is attached to a vacuum chamber in the mass spectrometer of the present embodiment.
Figure 4:
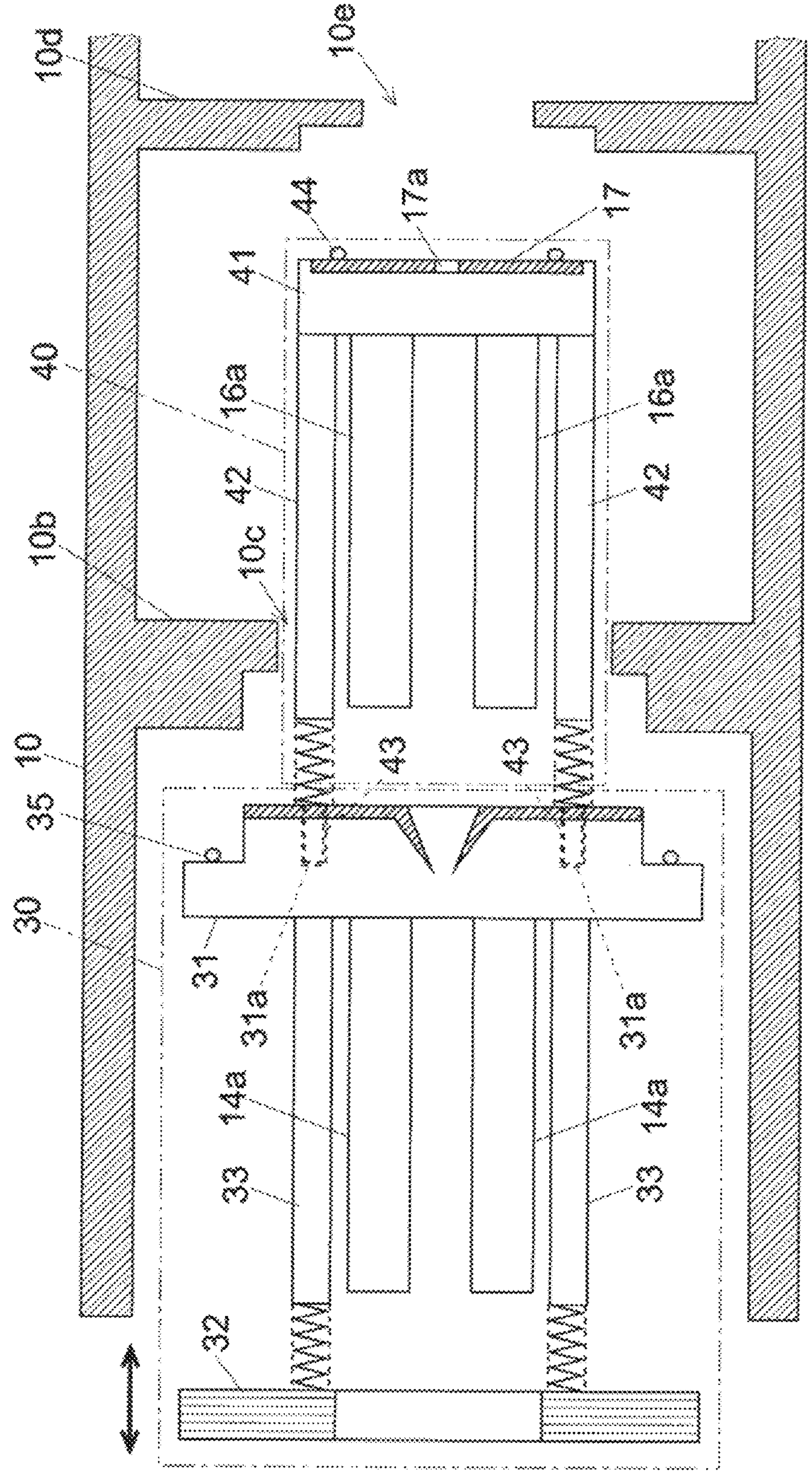
FIG. 4 is a schematic cross-sectional view illustrating a state when the ion transport unit is attached to and detached from the vacuum chamber in the mass spectrometer of the present embodiment.
Figure 5:
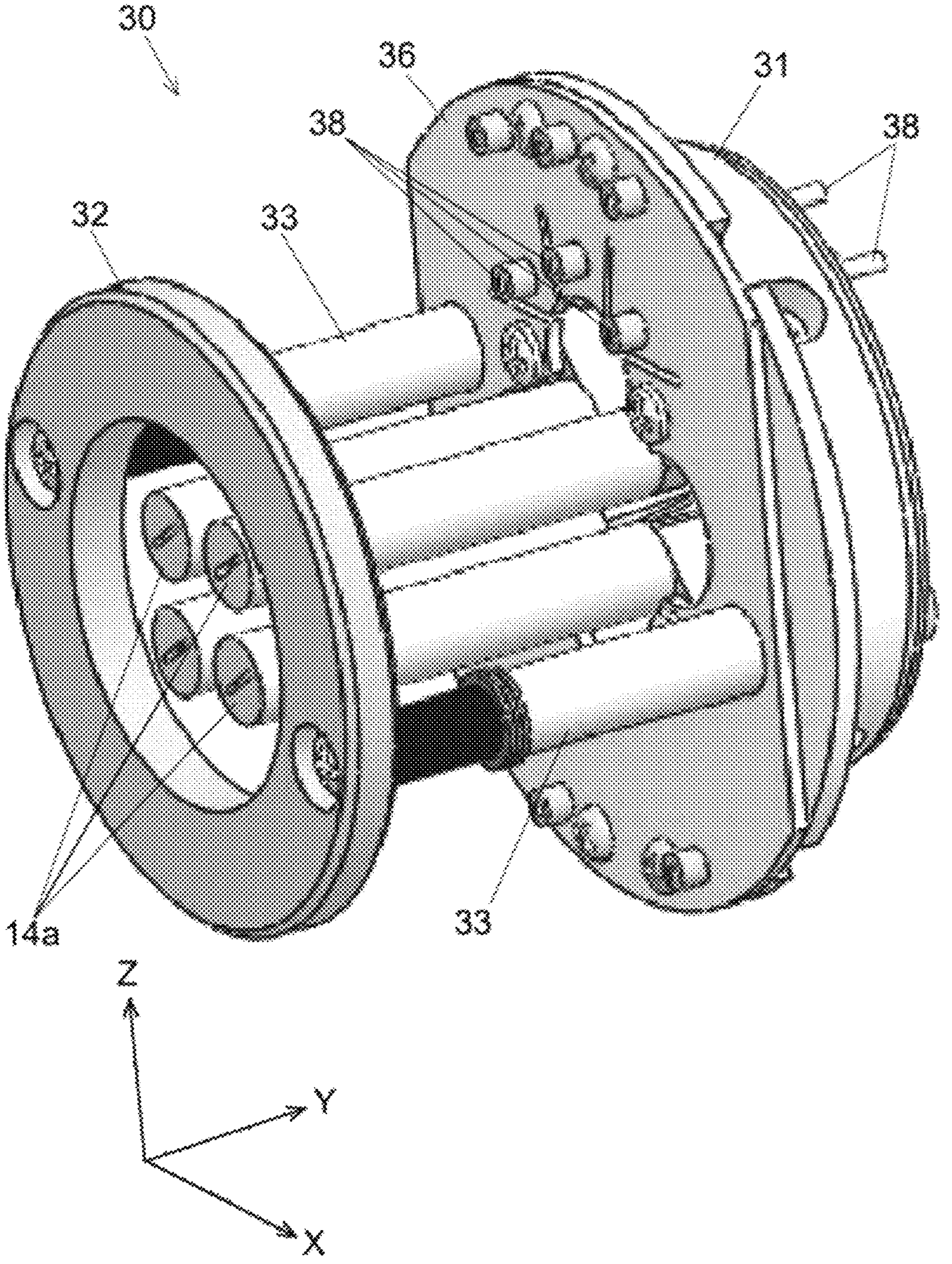
FIG. 5 is an external perspective view of a first unit disposed in a first intermediate vacuum chamber in the mass spectrometer of the present embodiment.
Figure 6:
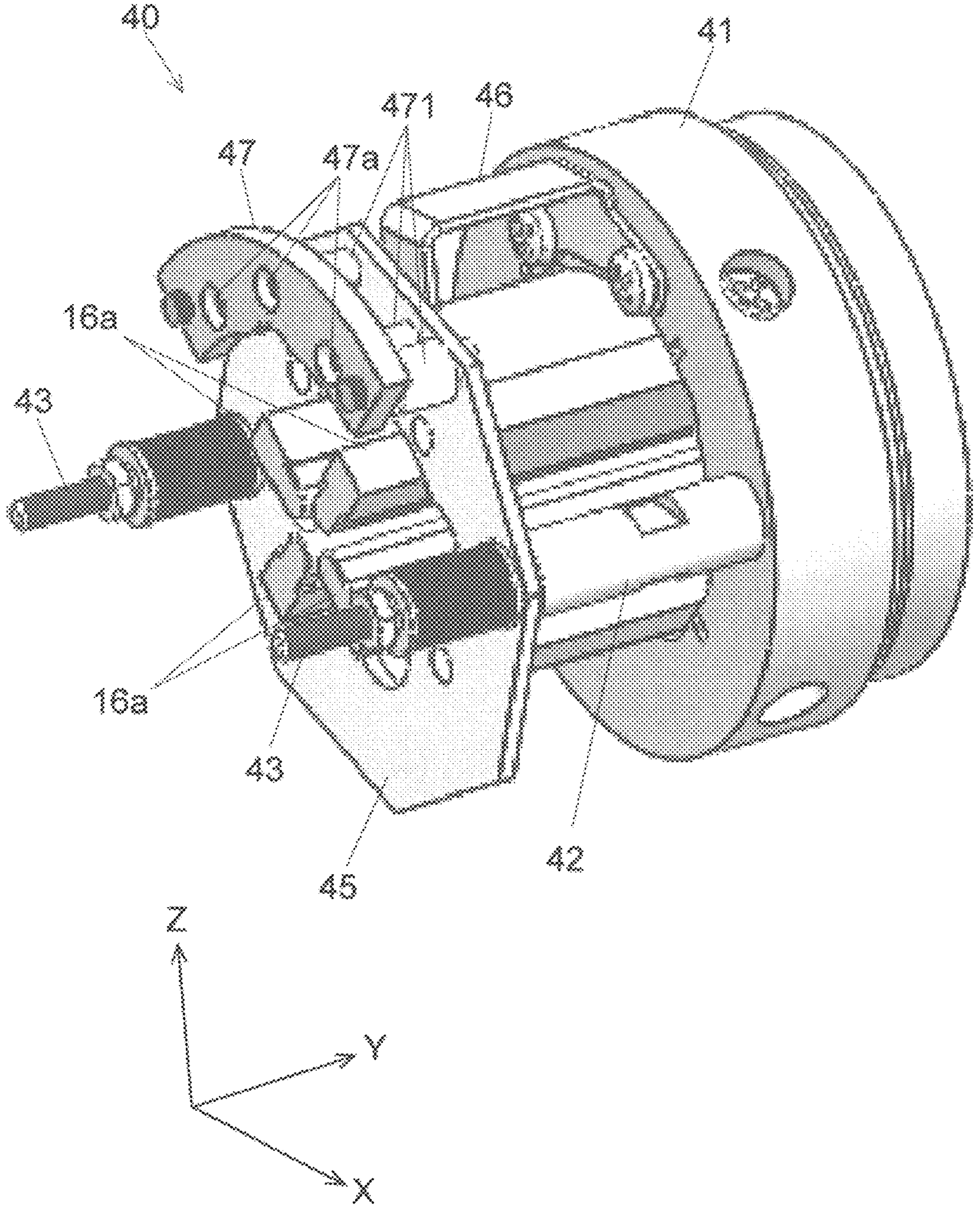
FIG. 6 is an external perspective view of a second unit disposed in a second intermediate vacuum chamber in the mass spectrometer of the present embodiment.

FIG. 3 is a schematic cross-sectional view illustrating a state in which the ion transport unit is attached in the vacuum chamber 1 in the mass spectrometer of the present embodiment. FIG. 4 is a schematic cross-sectional view illustrating a state when the ion transport unit is attached to and detached from the vacuum chamber 1 in the mass spectrometer of the present embodiment. FIG. 5 is an external perspective view of a first unit 30 disposed in the first intermediate vacuum chamber 11 in the mass spectrometer of the present embodiment. FIG. 6 is an external perspective view of a second unit 40 disposed in the second intermediate vacuum chamber 12 in the mass spectrometer of the present embodiment.

The ion transport unit includes two units of the first unit 30 illustrated in FIG. 5 and the second unit 40 illustrated in FIG. 6, and these units 30 and 40 are integrated.

As shown in FIG. 5, the first unit 30 includes a first holder 31 having a substantially annular shape, four rod electrodes 14*a* whose rear ends are fixed to the first holder 31, a plurality of elastic rods 33 whose rear ends are fixed to the first holder 31 and whose longitudinal portions are elastic bodies, an annular pressing ring 32 to which the front ends of the elastic rods 33 are fixed, a skimmer plate 34 attached to the first holder 31, and a circuit board 36 fixed to the first holder 31.

The four rod electrodes 14*a* constitute a first ion guide 14. In addition, the skimmer 15 is formed on the skimmer plate 34 made of metal. The elastic body of the elastic rod 33 is typically a spring, but is not limited thereto. The elastic rod 33 extends and contracts only in its longitudinal direction, and is attached in parallel to the ion optical axis C.

As shown in FIG. 6, the second unit 40 includes a second holder 41 having a substantially annular shape, four rod electrodes 16*a* having a trapezoidal cross section whose rear ends are fixed to the second holder 41, a plurality of elastic rods 42 whose rear ends are fixed to the second holder 41 and a part of which in the longitudinal direction is an elastic body, a lens electrode 17 made of metal attached to the second holder 41, a coupling fitting 46 whose one end is fixed to the second holder 41, a circuit board 45 fixed to the other end of the coupling fitting 46 and the elastic rods (strictly speaking, portions of the elastic rods that do not expand and contract due to elasticity) 42, and an electrical wiring connection portion 47 connected to the circuit board 45. The four rod electrodes 16*a* constitute the second ion guide 16. Similarly to the elastic rod 33, the elastic rod 42 extends and contracts only in the longitudinal direction thereof, and is attached in parallel to the ion optical axis C.

Both the elastic rod 42 and the elastic rod 33 have a rod portion having rigidity and an elastic portion that expands and contracts. For reasons described later, the elastic portion of the elastic rod 33 in the first unit 30 has a larger elastic force than the elastic portion of the elastic rod 42 in the second unit 40.

In addition, a plurality of cylindrical pins 43 protruding in the longitudinal direction of the elastic rod 42 are provided at the front end portion of the elastic rod 42. On the other hand, pin holes 31*a* into which the pins 43 are inserted are provided at positions corresponding to the pins 43 on the rear face (face facing the second intermediate vacuum chamber 12 side) of the first holder 31 of the first unit 30. Leaf springs that press the inserted pins 43 are disposed inside the pin holes 31*a*, and the pins 43 inserted into the pin holes 31*a* are less likely to come off from the pin holes 31*a* by the action of the leaf spring.

That is, by sufficiently inserting the pins 43 of the second unit 40 into the pin holes 31*a* of the first unit 30, the first unit 30 and the second unit 40 are connected to form an ion transport unit. For coupling between the first unit 30 and the second unit 40, a member that requires another tool for attachment and detachment, such as a screw, is not used, and the first unit 30 and the second unit 40 are coupled by simply fitting the pins 43 and the pin holes 31*a*. Therefore, the first unit 30 and the second unit 40 can be separated relatively easily.

When attaching the ion transport unit in the vacuum chamber 1, as illustrated in FIG. 4, the operator inserts the ion transport unit from the second unit 40 side into the vacuum chamber main body portion 10 horizontally from the front side of the device in a state where the vacuum flange 10*a* is removed. In this example, the member having the largest diameter about the central axis in the second unit 40 is the second holder 41. The outer diameter of the second holder 41 is a part of the partition wall separating the first intermediate vacuum chamber 11 and the second intermediate vacuum chamber 12 inside the vacuum chamber 1, and is smaller than the inner diameter of an opening portion 10*c* of a first partition wall portion 10*b* having the circular opening portion 10*c* in the substantial center thereof. Therefore, the second unit 40 can be inserted into the opening portion 10*c* without contacting the first partition wall portion 10*b*.

As described above, when the ion transport unit is inserted into the vacuum chamber main body portion 10 as it is, the second holder 41 of the second unit 40 becomes a part of the partition wall separating the second intermediate vacuum chamber 12 and the high vacuum chamber 13 in the vacuum chamber 1, and abuts on a second partition wall portion 10*d* having a circular opening portion 10*e* at the substantially center thereof. More specifically, the second holder 41 is provided with a seal member 44 such as an O-ring, the seal member 44 is sandwiched between the second holder 41 and the second partition wall portion 10*d*, and when the second holder 41 is pressed, the seal member 44 is crushed to seal the gap between the second holder 41 and the second partition wall portion 10*d*.

At the time when the second holder 41 abuts on the second partition wall portion 10*d*, the first holder 31 does not yet abut on the first partition wall portion 10*b*, but when the operator further pushes in the ion transport unit, the elastic portion of the second elastic rod 42 contracts by the force. As described above, since the elastic portion of the first elastic rod 33 has a larger elastic force than the elastic portion of the second elastic rod 42, when the end portion (left end portion in FIG. 4) of the ion transport unit is pushed, the elastic portion of the first elastic rod 33 does not contract but the elastic portion of the second elastic rod 42 contracts earlier. A force is applied to the seal member 44 by the biasing force of the elastic portion of the second elastic rod 42 and the seal member 44 is sufficiently crushed, so that high airtightness is exhibited.

When the operator further pushes the ion transport unit, the first holder 31 abuts on the first partition wall portion 10*b*. The first holder 31 is also provided with a seal member 35 such as an O-ring, the seal member 35 is sandwiched between the first holder 31 and the first partition wall portion 10*b*, and when the first holder 31 is pressed, the seal member 35 is crushed to seal the gap between the first holder 31 and the first partition wall portion 10*b*. When the operator further pushes the ion transport unit, the elastic portion of the first elastic rod 33 contracts by the force, and the pressing ring 32 is accommodated in the vacuum chamber main body portion 10.

In this state, when the operator fixes the vacuum flange 10*a* to the vacuum chamber main body portion 10 with a screw, as illustrated in FIG. 3, the pressing ring 32 is in a state of pressing the vacuum flange 10*a*, and a force is applied to the seal member 35 by the biasing force of the elastic portion of the first elastic rod 33 in a contracted state and the seal member 35 is sufficiently crushed, so that high airtightness is exhibited. In addition, a gap between the vacuum flange 10*a* and the vacuum chamber main body portion 10 is sealed by a seal member 10*f* such as an O-ring.

In the ion transport unit, the center of the small hole 17*a* of the lens electrode 17, the center axis of the second ion guide 16, the center of the orifice 15*a* of the skimmer 15, and the center axis of the first ion guide 14 are located on a straight line. In addition, the step formed in the peripheral edge of the opening portion 10*c* of the second partition wall portion 10*d* is fitted to the second holder 41, and the step formed in the peripheral edge portion of the opening portion 10*c* of the first partition wall portion 10*b* is fitted to the first holder 31. Therefore, when the ion transport unit is appropriately installed in the vacuum chamber main body portion 10 and the vacuum flange 10*a* is appropriately attached to the vacuum chamber main body portion 10, as illustrated in FIG. 3, the center axis of the desolvation line 24 is also aligned with the center axis of the ion transport unit, and the center axis of the quadrupole mass filter 18 installed in the high vacuum chamber 13 is also arranged on the same straight line. In this way, it is possible to install each ion optical element at an appropriate position while partitioning the vacuum chamber 1 so as to ensure airtightness in each vacuum chamber.

In order to take out the ion transport unit from the inside of the vacuum chamber main body portion 10 to the outside, it is only required to take out the ion transport unit in front of the device by a procedure reverse to the above.

In the mass spectrometer of the present embodiment, at the time of analysis, normally, the same radio-frequency voltage +RF1 is applied to the two rod electrodes 14*a* facing each other across the ion optical axis C among the four rod electrodes 14*a* constituting the first ion guide 14, and the radio-frequency voltage −RF1 having the same amplitude as the radio-frequency voltage +RF1 and the opposite polarity to the radio-frequency voltage +RF1 is applied to the other two rod electrodes 14*a*. In addition, the same radio-frequency voltage +RF2 is applied to the two rod electrodes 16*a* facing each other across the ion optical axis C among the four rod electrodes 16*a* constituting the second ion guide 16, and the radio-frequency voltage −RF2 having the same amplitude as the radio-frequency voltage +RF2 and the opposite polarity to the radio-frequency voltage +RF2 is applied to the other two rod electrodes 16*a*. In addition, a predetermined DC voltage is applied to each of the skimmer plate 34 and the lens electrode 17.

The vacuum chamber 1 is at a ground potential (0 V) which is a reference potential, and the skimmer plate 34 is also at the same potential as the vacuum chamber 1. Therefore, as illustrated in FIG. 3, the skimmer plate 34 and the vacuum chamber 1 are electrically connected in a state where the ion transport unit is appropriately mounted. In addition, it is necessary to apply a predetermined voltage from the outside to each of the rod electrode 14*a* constituting the first ion guide 14, the rod electrode 16*a* constituting the second ion guide 16, and the lens electrode 17, and conventionally, an electric wiring therefor is necessary. On the other hand, in the mass spectrometer of the present embodiment, when the ion transport unit is mounted in the vacuum chamber main body portion 10, power can be supplied to each ion optical element included in the ion transport unit without separately performing electrical wiring.

Figure 7:
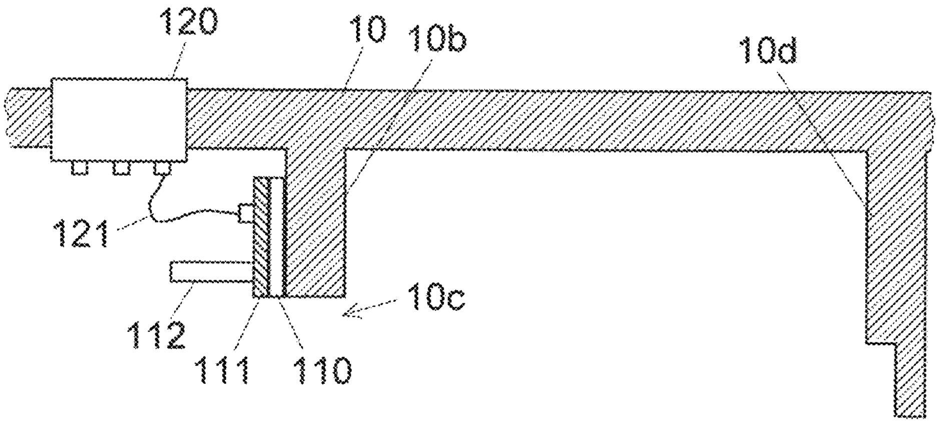
FIG. 7 is a schematic cross-sectional view of an electric wiring portion provided in the vacuum chamber in the mass spectrometer of the present embodiment.
Figure 8:
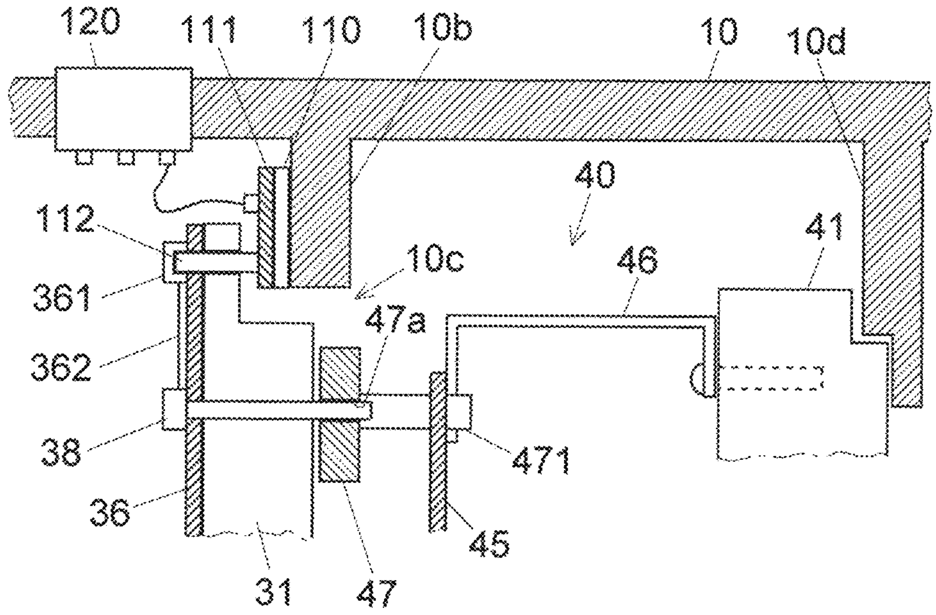
FIG. 8 is a schematic cross-sectional view of an electric wiring portion in a state where the ion transport unit is attached to the vacuum chamber in the mass spectrometer of the present embodiment.

FIG. 7 is a schematic cross-sectional view of an electric wiring portion provided in the vacuum chamber main body portion 10. FIG. 8 is a schematic cross-sectional view of the electric wiring portion in a state where the ion transport unit is attached to the vacuum chamber main body portion 10. Those Illustrated in FIGS. 7 and 8 are paths of electric wiring for applying a DC voltage to the lens electrode 17 held by the second holder 41.

As illustrated in FIG. 7, a power supply terminal 120 for supplying power from the outside to the inside of the vacuum chamber 1 is provided in a portion of the vacuum chamber main body portion 10 to be a wall face of the first intermediate vacuum chamber 11. The power supply terminal 120 includes a plurality of electrodes connecting the outside and the inside of the vacuum chamber 1. In addition, a power supply board III is attached to the face of the first partition wall portion 10*b* on the first intermediate vacuum chamber 11 side with the insulating member 110 interposed therebetween. The power supply board 11 is a printed board on which an electric wiring pattern is formed, and a connection post 112 made of metal is erected on the power supply board 111. The electrode of the power supply terminal 120 and the corresponding electrode on the power supply board 11 are connected via a cable line 121.

A predetermined electric wiring pattern 362 is formed on the circuit board 36 attached to the first holder 31 of the first unit 30, and a part thereof is illustrated in FIG. 8. A hole into which the connection post 112 on the power supply board 111 is inserted when the ion transport unit is appropriately mounted is formed in the first holder 31. The connection post 112 inserted into the hole comes into contact with the post receiving portion 361 on the circuit board 36, and an electrical connection therebetween is secured. Further, an energizing pin 38 made of metal protrudes rearward from the circuit board 36 through the first holder 31.

On the other hand, a hole 47*a* into which the energizing pin 38 is inserted when the first unit 30 and the second unit 40 are appropriately coupled is formed in the electrical wiring connection portion 47 of the second unit 40. The energizing pin 38 inserted into the hole 47*a* is connected to the electric wiring pattern on the circuit board 45 via the pin receiving portion 471. In the example illustrated in FIG. 8, the electric wiring pattern on the circuit board 45 is connected to the coupling fitting 46. In FIG. 8, when power is supplied from the power supply terminal 120 through the cable line 121, the power is sent to the second holder 41 through the cable line 121, the power supply boards 111 and 112, the connection post 112, the post receiving portion 361, the electric wiring pattern 362 on the circuit board 36, the energizing pin 38, the pin receiving portion 471, and the coupling fitting 46, and is supplied to the lens electrode 17 fixed to the second holder 41.

In addition, the radio-frequency voltages +RF1 and −RF1 sent from the power supply terminal 120 to the circuit board 36 by another energization path are applied to the four rod electrodes 14*a* via the electric wiring pattern on the circuit board 36. In addition, the radio-frequency voltages +RF2 and −RF2 sent from the power supply terminal 120 to the circuit board 45 may be applied to the four rod electrodes 16*a* through still another energizing path. Of course, not all the power feeding in the ion transport unit may be performed in the above-described configuration, but only a part thereof may be performed in the above-described configuration.

As described above, when the ion transport unit is mounted at a predetermined position in the vacuum chamber main body portion 10, power is supplied by the contact between the power supply unit provided on the vacuum chamber main body portion 10 side and the power receiving unit provided on the ion transport unit side, so that it is possible to reduce the use of complicated electric wiring, connectors, and the like. In addition, it is possible to reduce the trouble of inserting and removing the connector when attaching and detaching the ion transport unit.

Modifications

Note that, the above embodiment is merely an example of the present invention, and it is obvious that modifications, additions, and corrections appropriately made within the scope of the gist of the present invention are included in the claims of the present application.

For example, in the device of the above embodiment, the lens electrode 17 is attached to the second holder 41 which holds the rod electrode 16*a* of the second ion guide 16, and the lens electrode 17 and the second holder 41 themselves form a part of the partition wall that partitions the second intermediate vacuum chamber 12 and the high vacuum chamber 13, but the partition wall may be formed in advance in the vacuum chamber main body portion 10. That is, the ion optical element (the lens electrode 17 in the present example) provided on the partition wall that partitions the second intermediate vacuum chamber 12 and the high vacuum chamber 13 may not be configured to be drawable forward of the device.

In addition, the form of the ion optical element disposed in each intermediate vacuum chamber or provided on the partition wall separating the adjacent vacuum chambers is not limited to the above-described form, and it is a matter of course that various ion optical elements generally used can be used.

In addition, in the mass spectrometer of the above embodiment, the ion optical axis from the desolvation line 24 to the quadrupole mass filter 18 is straight, but the present invention is not limited thereto, and can also be applied to an ion optical system called axial shift, off-axis, or the like.

In addition, the above embodiment is an example in which the present invention is applied to a single quadrupole mass spectrometer. However, the present invention can also be applied to other mass spectrometers using an atmospheric pressure ion source, specifically, a triple quadrupole mass spectrometer, and the like.

Various Aspects

It will be understood by those skilled in the art that the exemplary embodiments described above are specific examples of the following aspects.

(Clause 1) One aspect of a mass spectrometer according to the present invention is a mass spectrometer including a plurality of intermediate vacuum chambers in which a degree of vacuum increases stepwise between an ionization chamber that ionizes a sample component under atmospheric pressure and a high vacuum chamber that performs mass spectrometry of ions generated in the ionization chamber, the mass spectrometer including:

- a first ion guide disposed in a first intermediate vacuum chamber which is a subsequent stage of the ionization chamber and configured to transport ions using an electric field;
- a first partition wall portion which constitutes at least a part of a partition wall separating the first intermediate vacuum chamber and a second intermediate vacuum chamber which is a subsequent stage of the first intermediate vacuum chamber, and has an ion passage hole;
- a second ion guide disposed in the second intermediate vacuum chamber and configured to transport ions using an electric field;
- a second partition wall portion which constitutes at least a part of a partition wall separating the second intermediate vacuum chamber and a vacuum chamber which is a subsequent stage of the second intermediate vacuum chamber, and has an ion passage hole;
- a first holding portion configured to hold the first ion guide and the first partition wall portion integrally;
- a second holding portion configured to hold the second ion guide;
- a coupling portion configured to detachably couple the first holding portion and the second holding portion; and
- a vacuum chamber main body portion to which an ion transport unit is detachably mounted, the ion transport unit being formed by the first holding portion and the second holding portion coupled by the coupling portion, the first holding portion being in a state of holding the first ion guide and the first partition wall portion and the second holding portion being in a state of holding the second ion guide.

According to the mass spectrometer described in Clause 1, when maintenance such as cleaning of various ion optical elements disposed in the first and second intermediate vacuum chambers is performed, the ion optical elements are integrally removed from the device as a unit instead of removing each ion optical element one by one from the device. In addition, even when each ion optical element is attached to the device after completion of maintenance, a plurality of ion optical elements can be integrally mounted to the device as a unit. As a result, the operation at the time of performing the maintenance of the ion optical element becomes very simple, and the efficiency of the operation is improved. In addition, since the first holding portion which holds the first ion guide and the first partition wall portion and the second holding portion which holds the second ion guide can be easily separated, the operation of cleaning each ion guide after the unit is detached from the device is also simple, and the operation efficiency is improved.

(Clause 2) In the mass spectrometer according to Clause 1, the second holding portion may be configured to integrally hold the second ion guide and the second partition wall portion, and the coupling portion may be configured to couple the first holding portion in a state of holding the first ion guide and the first partition wall portion and the second holding portion in a state of holding the second ion guide and the second partition wall portion.

According to the mass spectrometer described in Clause 2, since the second partition wall portion can also be integrally attached to and detached from the device together with the first ion guide and the second ion guide, the efficiency of the maintenance operation of the ion optical element is further improved.

(Clause 3) In the mass spectrometer according to Clause 1, the vacuum chamber may be disposed so as to extend in a front-rear direction of the device such that a degree of vacuum of each chamber increases sequentially from a front side to a rear side, a front wall portion of the vacuum chamber may be detachable, and the vacuum chamber may include:

a first partition wall receiving portion which constitutes a part of a partition wall separating the first intermediate vacuum chamber and the second intermediate vacuum chamber, and has, at a center of the partition wall, an opening portion closed by the first partition wall portion from a side of the first intermediate vacuum chamber; and a second partition wall receiving portion which constitutes a part of a partition wall separating the second intermediate vacuum chamber and a vacuum chamber which is a subsequent stage of the second intermediate vacuum chamber, and has, at a center of the partition wall, an opening portion closed by the second partition wall portion from a side of the second intermediate vacuum chamber, and an inner diameter of an opening portion of the first partition wall receiving portion may be determined to be larger than a diameter of a maximum inscribed circle among the second ion guide, the second partition wall portion, and the second holding portion.

According to the mass spectrometer described in Clause 3, the ion transport unit in which the first ion guide and the second ion guide are integrated can be attached to and detached from the front of the mass spectrometer. Therefore, it is not necessary to attach and detach the ion guide or the like from above or from the side of the device, and another device can be stacked and installed above the present device. In addition, the lateral space of the present device may also be narrow. Furthermore, a plurality of vacuum chambers separated by a partition wall can be formed inside the vacuum chamber only by mounting the ion transport unit in the vacuum chamber and closing the front wall portion.

(Clause 4) The mass spectrometer according to Clause 3 may further include:

a first seal portion disposed between the first partition wall portion and the first partition wall receiving portion;

a second seal portion disposed between the second partition wall portion and the second partition wall receiving portion; and a third seal portion disposed between a front wall portion of the vacuum chamber and a vacuum chamber main body portion to which the front wall portion is mounted.

According to the mass spectrometer described in Clause 4, airtightness of each vacuum chamber formed inside the vacuum chamber is secured.

(Clause 5) The mass spectrometer according to Clause 3 or 4 may further include:

a first elastic body which extends in the front-rear direction and has a biasing force in the front-rear direction, and a rear end portion of the first elastic body is held by the first holding portion; and a second elastic body which extends in the front-rear direction and has a biasing force in the front-rear direction, a rear end portion of the second elastic body is held by the second holding portion, and a front end portion of the second elastic body abuts on the first holding portion, and an elastic force of the first elastic body may be determined to be larger than an elastic force of the second elastic body.

In the mass spectrometer described in Clause 5, when the ion transport unit is inserted into the vacuum chamber from the front of the device, first, the second partition wall portion held by the second holding portion abuts on the second partition wall receiving portion, and the second holding portion is positioned. Then, when a rearward force is applied to the ion transport unit, the second elastic body contracts, the second partition wall portion held by the first holding portion abuts on the second partition wall receiving portion, and the first holding portion is positioned. At this time, adhesion between the second partition wall portion and the second partition wall receiving portion is secured by the biasing force of the second elastic body. When a further rearward force is applied to the ion transport unit, the first elastic body contracts, so that the front wall portion can be mounted to the vacuum chamber main body portion. At this time, adhesion between the first partition wall portion and the first partition wall receiving portion is secured by the biasing force of the first elastic body.

In this manner, according to the mass spectrometer described in Clause 5, it is possible to ensure high airtightness between the vacuum chambers located on the far side of the vacuum chamber, that is, having a relatively high degree of vacuum.

(Clause 6) In the mass spectrometer according to any one of Clauses 3 to 5, the ionization chamber may be movable between an analysis position in front of the front wall portion of the vacuum chamber and an open position deviated from the front of the front wall portion.

According to the mass spectrometer described in Clause 6, the front wall portion of the vacuum chamber is removed in a state where the ionization chamber is moved to the open position, and the ion transport unit can be attached to and detached from the opening portion of the front face of the vacuum chamber main body portion.

(Clause 7) The mass spectrometer according to any one of Clauses 3 to 6 may further include:

a power supply unit provided in at least one of the first partition wall receiving portion and the second partition wall receiving portion; and a power receiving portion provided on at least one of the first partition wall portion and the second partition wall portion and connected to the power supply unit in a state where the first partition wall portion closes the opening portion of the first partition wall receiving portion or in a state where the second partition wall portion closes the opening portion of the second partition wall receiving portion, and power may be supplied from the power receiving portion to at least one of the first ion guide, the first partition wall portion, the second ion guide, and the second partition wall portion.

According to the mass spectrometer described in Clause 7, by mounting the ion transport unit inside the vacuum chamber, power can be supplied from the vacuum chamber side to each ion optical element. Accordingly, complicated electric wiring using a connector or the like can be eliminated or reduced.

In addition, when the first holding portion and the second holding portion are connected to each other, the first holding portion and the second holding portion are electrically connected to each other, so that it is possible to receive power supply from the power supply unit of the vacuum chamber only on one side and supply power to the other side.

REFERENCE SIGNS LIST

1 . . . Vacuum Chamber
10 . . . Vacuum Chamber Main Body Portion
10*a* . . . Vacuum Flange
10*b* . . . First Partition Wall Portion
10*c*, 10*e* . . . Opening Portion
10*d* . . . Second Partition Wall Portion
10*f* . . . Seal Member
11 . . . First Intermediate Vacuum Chamber
12 . . . Second Intermediate Vacuum Chamber
13 . . . High Vacuum Chamber
14 . . . First Ion Guide
14*a* . . . Rod Electrode
15 . . . Skimmer
15*a* . . . Orifice
16 . . . Second Ion Guide
16*a* . . . Rod Electrode
17 . . . Lens Electrode
17*a* . . . Small Hole
18 . . . Quadrupole Mass Filter
19 . . . Ion Detector
20 . . . Ionization Chamber
21 . . . DL Flange
22 . . . Ionization Chamber
23 . . . Ionization Probe
24 . . . Desolvation Line
24*a* . . . Ion Introduction Port
25 . . . Heater
30 . . . First Unit
31 . . . First Holder
31*a* . . . Pin Hole
32 . . . Pressing Ring
33 . . . First Elastic Rod
34 . . . Skimmer Plate
35 . . . Seal Member
36 . . . Circuit Board
361 . . . Post Receiving Portion
362 . . . Electric Wiring Pattern
38 . . . Energizing Pin
40 . . . Second Unit
41 . . . Second Holder
42 . . . Second Elastic Rod
43 . . . Pin
44 . . . Seal Member
45 . . . Circuit Board
46 . . . Coupling Fitting
47 . . . Electrical Wiring Connection Portion
471 . . . Pin Receiving Portion
47*a* . . . Hole
C . . . Ion Optical Axis
110 . . . Insulating Member
111 . . . Power Supply Board
112 . . . Connection Post
120 . . . Power Supply Terminal
121 . . . Cable Line

The invention claimed is:

1. A mass spectrometer, comprising:
an ionization chamber that ionizes a sample component under atmospheric pressure;
a vacuum chamber, including:
a high vacuum chamber that performs mass spectrometry of ions generated in the ionization chamber; and
a plurality of intermediate vacuum chambers in which a degree of vacuum increases stepwise between the ionization chamber and the high vacuum chamber, the plurality of intermediate vacuum chambers including a first intermediate vacuum chamber and a second intermediate vacuum chamber;
a first ion guide disposed in the first intermediate vacuum chamber which is a subsequent stage of the ionization chamber and configured to transport ions using an electric field;
a first ion optical element which constitutes a part of a first partition wall separating the first intermediate vacuum chamber and the second intermediate vacuum chamber which is a subsequent stage of the first intermediate vacuum chamber, and has an ion passage hole;
a second ion guide disposed in the second intermediate vacuum chamber and configured to transport ions using an electric field;
a second ion optical element which constitutes a part of a second partition wall separating the second intermediate vacuum chamber and the high vacuum chamber which is a subsequent stage of the second intermediate vacuum chamber, and has an ion passage hole; and an ion transport unit including:
a first holder configured to hold the first ion guide, a part of the first holder forming the first ion optical element; and
a second holder configured to hold the second ion guide, the second holder including a coupling configured to detachably couple the first holder and the second holder;
wherein the ion transport unit is detachably mounted to the vacuum chamber;
wherein the second holder is configured hold the second ion guide and a part of the second holder forms the second ion optical element, and
wherein the coupling is configured to couple the first holder to the second holder in a state of holding the first ion guide and in which the part of the first holder forms the first ion optical element and of holding the second ion guide and in which the part of the second holder forms the second ion optical element.

2. The mass spectrometer according to claim 1,
wherein the vacuum chamber is disposed so as to extend in a front-rear direction of the device such that a degree of vacuum of each chamber increases sequentially from a front side to a rear side, a front wall portion of the vacuum chamber is detachable, and the vacuum chamber includes:
a first partition wall portion which constitutes a part of the first partition wall separating the first intermediate vacuum chamber and the second intermediate vacuum chamber, and has, at a center of the first partition wall, an opening closed by the first ion optical element from a side of the first intermediate vacuum chamber; and a second partition wall portion which constitutes a part of the second partition wall separating the second intermediate vacuum chamber and the high vacuum chamber, and has, at a center of the second partition wall, an opening closed by the second ion optical element from a side of the second intermediate vacuum chamber, and wherein an inner diameter of the opening of the first partition wall portion is larger than a diameter of a maximum inscribed circle among the second ion guide, the second ion optical element, and the second holder.

3. The mass spectrometer according to claim 2, further comprising:

a first seal portion disposed between the first holder and the first partition wall portion;

a second seal portion disposed between the second ion optical element and the second partition wall portion; and a third seal portion disposed between the front wall portion of the vacuum chamber and a vacuum chamber main body portion to which the front wall portion is mounted.

4. A mass spectrometer, comprising:

an ionization chamber that ionizes a sample component under atmospheric pressure;

a vacuum chamber, including:

a high vacuum chamber that performs mass spectrometry of ions generated in the ionization chamber; and a plurality of intermediate vacuum chambers in which a degree of vacuum increases stepwise between the ionization chamber and the high vacuum chamber, the plurality of intermediate vacuum chambers including a first intermediate vacuum chamber and a second intermediate vacuum chamber;

a first ion guide disposed in the first intermediate vacuum chamber which is a subsequent stage of the ionization chamber and configured to transport ions using an electric field;

a first ion optical element which constitutes a part of a first partition wall separating the first intermediate vacuum chamber and the second intermediate vacuum chamber which is a subsequent stage of the first intermediate vacuum chamber, and has an ion passage hole;

a second ion guide disposed in the second intermediate vacuum chamber and configured to transport ions using an electric field;

a second ion optical element which constitutes a part of a second partition wall separating the second intermediate vacuum chamber and the high vacuum chamber which is a subsequent stage of the second intermediate vacuum chamber, and has an ion passage hole; and an ion transport unit including:

a first holder configured to hold the first ion guide, a part of the first holder forming the first ion optical element; and a second holder configured to hold the second ion guide, the second holder including a coupling configured to detachably couple the first holder and the second holder;

wherein the ion transport unit is detachably mounted to the vacuum chamber;

wherein the vacuum chamber is disposed so as to extend in a front-rear direction of the device such that a degree of vacuum of each chamber increases sequentially from a front side to a rear side, a front wall portion of the vacuum chamber is detachable, and the vacuum chamber includes:

a first partition wall portion which constitutes a part of the first partition wall separating the first intermediate vacuum chamber and the second intermediate vacuum chamber, and has, at a center of the first partition wall, an opening closed by the first ion optical element from a side of the first intermediate vacuum chamber; and a second partition wall portion which constitutes a part of the second partition wall separating the second intermediate vacuum chamber and the high vacuum chamber, and has, at a center of the second partition wall, an opening closed by the second ion optical element from a side of the second intermediate vacuum chamber, and wherein an inner diameter of the opening of the first partition wall portion is larger than a diameter of a maximum inscribed circle among the second ion guide, the second ion optical element, and the second holder;

the mass spectrometer further comprising a first elastic body which extends in the front-rear direction and has a biasing force in the front-rear direction, and a rear end portion of the first elastic body is held by the first holder; and a second elastic body which extends in the front-rear direction and has a biasing force in the front-rear direction, a rear end portion of the second elastic body is held by the second holder, and a front end portion of the second elastic body abuts on the first holder, wherein an elastic force of the first elastic body is determined to be larger than an elastic force of the second elastic body.

5. The mass spectrometer according to claim 2, wherein the ionization chamber is movable between an analysis position in front of the front wall portion of the vacuum chamber and an open position deviated from the front of the front wall portion.

6. The mass spectrometer according to claim 2, further comprising:

a power supply unit provided in at least one of the first partition wall portion and the second partition wall portion; and a power receiving portion provided on at least one of the first holder and the second holder and connected to the power supply unit in a state where the first ion optical element closes the opening of the first partition wall portion or in a state where the second ion optical element closes the opening of the second partition wall portion, and wherein power is supplied from the power receiving portion to at least one of the first ion guide, the first ion optical element, the second ion guide, and the second ion optical element.

* * * * *